US006848836B2

(12) United States Patent
Ueda et al.

(10) Patent No.: US 6,848,836 B2
(45) Date of Patent: Feb. 1, 2005

(54) OPTICAL FIBER CONNECTOR WITH A BASE END THREADED FERRULE

(75) Inventors: Yoshihisa Ueda, Kyoto (JP); Tomohiro Hikosaka, Kyoto (JP); Akihiro Domoto, Nagano (JP)

(73) Assignees: Suncall Kabushiki Kaisha, Kyoto (JP); Mimaki Denshi Buhin Kabushiki Kaisha, Nagano (JP)

( * ) Notice: Subject to any disclaimer, the term of this patent is extended or adjusted under 35 U.S.C. 154(b) by 0 days.

(21) Appl. No.: 10/432,491

(22) PCT Filed: Mar. 4, 2002

(86) PCT No.: PCT/JP02/01984
§ 371 (c)(1),
(2), (4) Date: May 27, 2003

(87) PCT Pub. No.: WO03/034120
PCT Pub. Date: Apr. 24, 2003

(65) Prior Publication Data
US 2004/0105625 A1 Jun. 3, 2004

(30) Foreign Application Priority Data
Oct. 9, 2001 (JP) ....................................... 2001-311183

(51) Int. Cl.[7] ................................................ G02B 6/36
(52) U.S. Cl. ........................................... 385/78; 385/88
(58) Field of Search .............................. 385/78, 88, 72, 385/90

(56) References Cited

U.S. PATENT DOCUMENTS 5,136,672 A  * 8/1992  Mulholland et al. ........... 385/53
5,390,269 A    2/1995  Palecek et al. ................ 385/78
6,179,482 B1 * 1/2001  Takizawa et al. .............. 385/81
6,428,215 B1 * 8/2002  Nault ............................ 385/78
6,655,851 B1 * 12/2003 Lee ............................... 385/78

FOREIGN PATENT DOCUMENTS

| EP | 0 330 399 A1 | 8/1989 | ............ G02B/6/38 |
| EP | 0 710 860 A1 | 5/1996 | ............ G02B/6/38 |
| JP | 8-160255 | 6/1996 | ............ G02B/6/38 |

* cited by examiner

Primary Examiner—Chandrika Prasad
(74) Attorney, Agent, or Firm—Darby & Darby

(57) ABSTRACT

The present invention provides an optical fiber connector for making high-precision optical connections between optical fibers. During assembly, a ferrule is rotationally adjusted around its axis 360° without stepping. The assembly, including this rotational adjustment, can be performed easily and reliably.

An optical fiber connector 1 comprises: a housing 2 that can be mounted on and removed from an adapter A; a ferrule 3 through which a cladding portion F1 at the end of an optical fiber F is inserted is rotatably housed in the housing 2 so that it can move along the axial direction; a compression coil spring 4 biasing the ferrule 3 in the axial end direction; and a rotation-restricting slide mechanism 5 that restricts rotation of the ferrule 3 relative to the housing 2 at the base-end side of the housing 3 and that allows the ferrule 3 to slide in the axial direction.

17 Claims, 17 Drawing Sheets

OPTICAL FIBER CONNECTOR WITH A BASE END THREADED FERRULE

CROSS REFERENCE TO PRIOR APPLICATION

This is a U.S. national phase application under 35 U.S.C. §371 of International Patent Application No. PCT/JP02/01984, filed Mar. 4, 2002 and claims benefit of Japanese Patent Application No. 2001-311183, filed Oct. 9, 2001. The International Application was published in Japanese on Apr. 24, 2003 as WO 03/034120 A1 under PCT Article 21(2).

FIELD OF THE INVENTION

The present invention relates to an optical fiber connector with a housing, a ferrule, and a compression coil spring. More specifically, the present invention relates to an optical fiber connector with a rotation-restricting slide mechanism that restricts the rotation of the ferrule relative to the housing and that allows the ferrule to slide along the axis.

BACKGROUND OF THE INVENTION

Conventionally, when making an optical connection between optical fibers, an optical fiber connector (hereinafter referred to as a connector) is attached to each of the ends of the two optical fibers. These two connectors are connected to an adapter so that the end surfaces of the optical fibers abut and form a connection.

This type of connector generally comprises: a housing that is attachable to and removable from an adapter; a ferrule housed in the housing that can move along an axial direction; and a compression coil spring mounted in the housing and biasing the ferrule along the axis toward the free leading end.

A fiber insertion hole (e.g., with a diameter of 127 microns) is formed at the axial center of the ferrule. Cladding portion (e.g., with a diameter of 125 microns) at the end of the optical fiber is inserted through and supported in the fiber insertion hole.

The ferrule and the end surface of the cladding portion in each connector are polished to form a co-planar surface. When the two connectors are connected via the adapter, the end surfaces of the ferrules of the connectors are pressed by the compression coil spring so that the end surfaces of the ferrules abut each other and form a connection. As a result, the end surfaces of the cladding portion are pressed against each other in a stable manner to form a connection.

However, the fiber insertion hole of the ferrule is often formed eccentric relative to the axial center due to production tolerances and the like (e.g., eccentricities of 1 micron or less). Thus, at the connection surface of the optical fibers, there may be a radial offset between the fiber insertion holes of the ferrules. In other words, there can be a radial offset between the cladding portion (i.e., the core (e.g., 9 microns in diameter) formed at the center of the cladding portion) of the two optical fibers inserted into the fiber insertion holes. This leads to optical loss and a reduction in optical transmission rates.

The present applicant has implemented a connector with a ferrule provided with a hexagonal flange and a hexagonal hole formed inside the housing that can engage with a hexagonal flange. In this connector, when the ferrule is housed in the housing, the hexagonal flange engages with the hexagonal hole while being biased by the compression coil spring. Thus, the ferrule cannot rotate relative to the housing.

In this connector, at an assembling and adjusting stage, once the ferrule is housed in the housing, the engagement between the hexagonal flange and the hexagonal hole is released by inserting the tip of a specialized jig from the end of the housing to apply pressure against the biasing force from the compression coil spring. Then, the jig is rotated to rotationally adjust the ferrule relative to the housing, thereby allowing the positioning at one of six positions at which the hexagonal flange and the hexagonal hole can engage. The position that is selected from the six positions is the position at which the radial offset between the fiber insertion holes is minimized. When the tip of the jig is removed from the housing, the hexagonal flange re-engages with the hexagonal hole so that the ferrule cannot rotate relative to the housing.

Japanese Laid-Open Patent Publication Number 8-160255 discloses a connector with a stop ring which is screwed to the inside of the housing. A key on this stop ring slidably engages with a key groove formed on a flange of a ferrule and extending along the axial direction. When assembling this connector, the ferrule and the stop ring can be rotated 360° around the axis in a non-stepping manner relative to the housing. Then, adhesive is injected into the housing so that the housing and the stop ring are secured and the ferrule cannot rotate relative to the housing.

In polarization-retaining optical fibers, the cladding portion is formed with a core and a stress application section (e.g., a quartz glass with additives, which is formed from $B_2O_3$). Light is transmitted while a predetermined polarization state is retained. Thus, when connecting together polarization-retaining optical fibers, the polarization-retaining optical fibers and their cladding portions must be connected to transmit light while the polarization state is retained by adjusting the rotational phase.

In the connector implemented by the present applicant, the hexagonal flange of the ferrule is engaged with the hexagonal hole in the housing. This prevents rotation of the ferrule relative to the housing. However, the hexagonal flange and the hexagonal hole can engage only at any one of six positions. As a result, it is difficult to eliminate completely optical loss at the connection surface between the optical fibers, thereby reducing the optical transmission rate.

Also, in this connector, after the ferrule is housed in the housing, the tip of a specialized jig is pushed in from the leading end of the housing to release the engagement of the hexagonal flange and the hexagonal hole. The jig is then rotated to adjust the angle of the ferrule relative to the housing. Since the ferrule cannot be adjusted while observing from the leading end, making the adjustments for the appropriate positioning of the ferrule becomes more difficult.

In the connector of Japanese Laid-Open Patent Publication Number 8-160255, the ferrule that can be rotationally adjusted 360° around its axis relative to the housing in a non-stepping manner. Thus, reduction in the optical transmission rate can be minimized. However, a stop ring is screwed to the inside of the housing, thereby making it not easy to make rotational adjustments by rotating the ferrule and the stop ring relative to the housing.

OBJECT AND SUMMARY OF THE INVENTION

The object of the present invention is to provide an optical fiber connector for making high-precision optical connections between optical fibers wherein a rotation-restricting slide mechanism is disposed toward the base end of a housing. Thus, the ferrule can be rotationally adjusted 360° in a non-stepping manner during assembly, and the assembly of the connector, which includes the rotational adjustment operation, can be performed simply and reliably.

In the optical fiber connector according to the present invention, an optical fiber connector is attached to an end of an optical fiber and used with an adapter in an optical connection. The optical fiber connector comprises: a housing that is attachable to and removable from the adapter; a ferrule through which a cladding portion at the end of the optical fiber is inserted and supported and which is housed slidably toward an axial direction in the housing in a rotatable manner during assembly; a compression coil spring mounted in the housing; and a rotation-restricting slide mechanism disposed toward a base end of the housing. The compression coil spring biases the ferrule toward the end along an axis, and the rotation-restricting slide mechanism restricts the rotation of the ferrule relative to the housing and allows the ferrule to slide along the axis.

The ferrule is housed in the housing so that it can move along the axis, and the compression coil spring mounted in the housing biases the ferrule toward the end. The cladding portion at the end of the optical fiber is inserted through and is supported by the ferrule. The rotation-restricting slide mechanism positioned toward the base end of the housing restricts the rotation of the ferrule relative to the housing and allows the ferrule to slide along the axis relative to the housing.

During the assembly of the optical fiber connector, the ferrule is rotatably supported in the housing. Thus, the ferrule can be rotationally adjusted relative to the housing so that, for example, the rotational phase can be easily and reliably adjusted to maximize the optical transmission rate for standard optical fibers. For polarization-retaining optical fibers, the rotational phase can be easily and reliably adjusted to minimize polarization cross-talk. After making these adjustments, the rotation-restricting slide mechanism can restrict rotation of the ferrule relative to the housing while allowing the ferrule to slide along the axis.

When two optical fiber connectors are connected to the ends of an adapter, the compression coil spring presses together the end surfaces of the ferrules of the optical fiber connectors to form an optical connection. Thus, the end surfaces of the cladding portion of the optical fibers are connected in a stable manner, allowing a high-precision optical connection between the optical fibers.

In order to provide high-precision optical connections between optical fibers, the ferrule can be rotationally adjusted continuously 360° around the axis during the assembly stage. The optical fiber connector assembly operation, including this rotational adjustment operation, can be performed easily and reliably.

According to an embodiment of the present invention, the housing of the optical fiber connector can comprise: a main housing body that is attachable to and removable from the adapter; and an extender cap which is engaged with and connected to a base end of the main housing body. When the main housing body, the ferrule, and the compression coil spring are assembled, the ferrule and the compression coil spring are housed in the main housing body while the main housing body is separated from the extender cap. Then, the extender cap can be easily engaged with and attached to the main housing body. At this stage, the ferrule can be rotationally adjusted relative to the housing easily and reliably.

According to an embodiment of the present invention, the ferrule can comprise a base-end screw inserted through the extender cap and projecting toward the base end of the housing, and the rotation-restricting slide mechanism can comprise a slit, a key member, an adjustment nut, and an adhesive section. The slit is formed on the extender cap and extends along the axis. The key member comprises a key which slidably engages with the slit and fits on the outside of the base-end screw of the ferrule. Thus, the key is movable along the axial direction relative to the housing, but the key cannot rotate relative to the housing. The adjustment nut abuts a base-end surface opposite from the key of the key member, and the adjustment nut fits on the outside of and is screwed to the base-end screw of the ferrule. The adhesive section secures the adjustment nut and the key member.

Since the key of the key member slidably engages with the slit, which extends along the axis on the extender cap, the key member can slide along the axis relative to the housing while being prevented from rotating. The adjustment nut abuts the base-end surface of the key member, and the adjustment nut and the key member are secured by the adhesive section. Since the adjustment nut fits outside of and is screwed onto the base-end screw of the ferrule, the ferrule is prevented from rotating relative to the housing while being able to slide along the axis.

The ferrule comprises the base-end screw, which is inserted through the extender cap and projects toward the base end of the housing. The rotation-restricting slide mechanism is disposed near the base-end screw, thereby allowing the ferrule to be observed from the leading end while the ferrule is rotationally adjusted. After this adjustment operation, the key member, the adjustment nut, and the like can be assembled easily to form the rotation-restricting slide mechanism.

According to an embodiment of the present invention, the rotation-restricting slide mechanism can comprise an adhesive section, which secures the ferrule and the adjustment nut. Rotation of the ferrule relative to the housing can be reliably restricted.

According to an embodiment of the present invention, the base-end screw of the ferrule can comprise a rotation operation section for rotating the ferrule. The rotation operation section can be grasped with a rotation tool or the like, and the ferrule can be rotationally adjusted easily.

According to an embodiment of the present invention, the adjustment nut and the key member can be secured by the adhesive section after the ferrule has been rotationally adjusted relative to the housing and the key member so that the rotational phase maximizes an optical transmission rate. Thus, the assembly of the optical fiber connector, which includes the rotational adjustment of the ferrule, can be performed easily and reliably to maximize the optical transmission rate.

According to an embodiment of the present invention, the adjustment nut and the key member are secured by the adhesive section after the ferrule has been rotationally adjusted relative to the housing and the key member so that the rotational phase minimizes polarization cross-talk. Thus, the assembly of the optical fiber connector, which includes the rotational adjustment of the ferrule, can be performed easily and reliably to minimize polarization cross-talk.

According to another embodiment of the present invention, the ferrule can include a base-end threaded section that passes through the extender cap and extends to the base end of the housing. The rotation-restricting slide mechanism can include a retention member securely disposed on the extender cap, an axially extended slit on the retention member, a nut serving as an adjustment nut, and a key formed integrally on the adjustment nut. A ferrule is inserted through the retention member. The adjustment nut is movably housed in the retention member and fits onto the outside of the base-end threaded section of the ferrule via threading. The adjustment nut is formed integrally with a key which is slidably engaged with the slit.

When the key of the adjustment nut is slidably engaged with the axially oriented slit of the retention member, the adjustment nut can slide axially relative to the housing while being prevented from rotating relative to the housing. Since the nut section of the adjustment nut fits via threading onto the base-end threaded section of the ferrule, the ferrule is prevented from rotating relative to the housing while being allowed to slide axially.

When the nut section and the key are formed integrally in the adjustment nut, the rotation-restricting slide mechanism can have a simple structure. This provides advantages in production costs while simplifying the assembly of the optical fiber connector with a rotation-restricting slide mechanism.

When the adjustment nut fits inside the retention member and is guided so that it can slide in the axial direction, the ferrule, which is formed integrally with the adjustment nut, can move axially in a smooth manner. Also, the retention member formed from metallic material is secured so that it fits inside the extender cap, and therefore, the strength of the retention member can be increased and the adjustment nut can be guided reliably.

When the rotation-restricting slide mechanism includes an adhesive section for securing the ferrule and the adjustment nut, rotation of the ferrule relative to the housing can be reliably restricted. When the rotation operation section for rotating the ferrule is formed at the base-end threaded section of the ferrule, a rotation tool or the like can engage with the rotation operation section, and the rotation tool or the like can be used to easily rotate and adjust the ferrule.

When the rotation-restricting slide mechanism includes the key, the adjustment nut and the key can be secured by the adhesion section so that the ferrule is rotationally adjusted and set, relative to the housing and the key, to a rotational phase that maximizes light transmission efficiency. This arrangement provides easy and reliable assembly of the optical fiber connector, which includes rotationally adjusting the ferrule to maximize light transmission efficiency. Alternatively, the adjustment nut and the key can be secured by the adhesion section with the ferrule rotationally adjusted relative to the housing and key member so that rotational phase minimizes polarization cross-talk.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
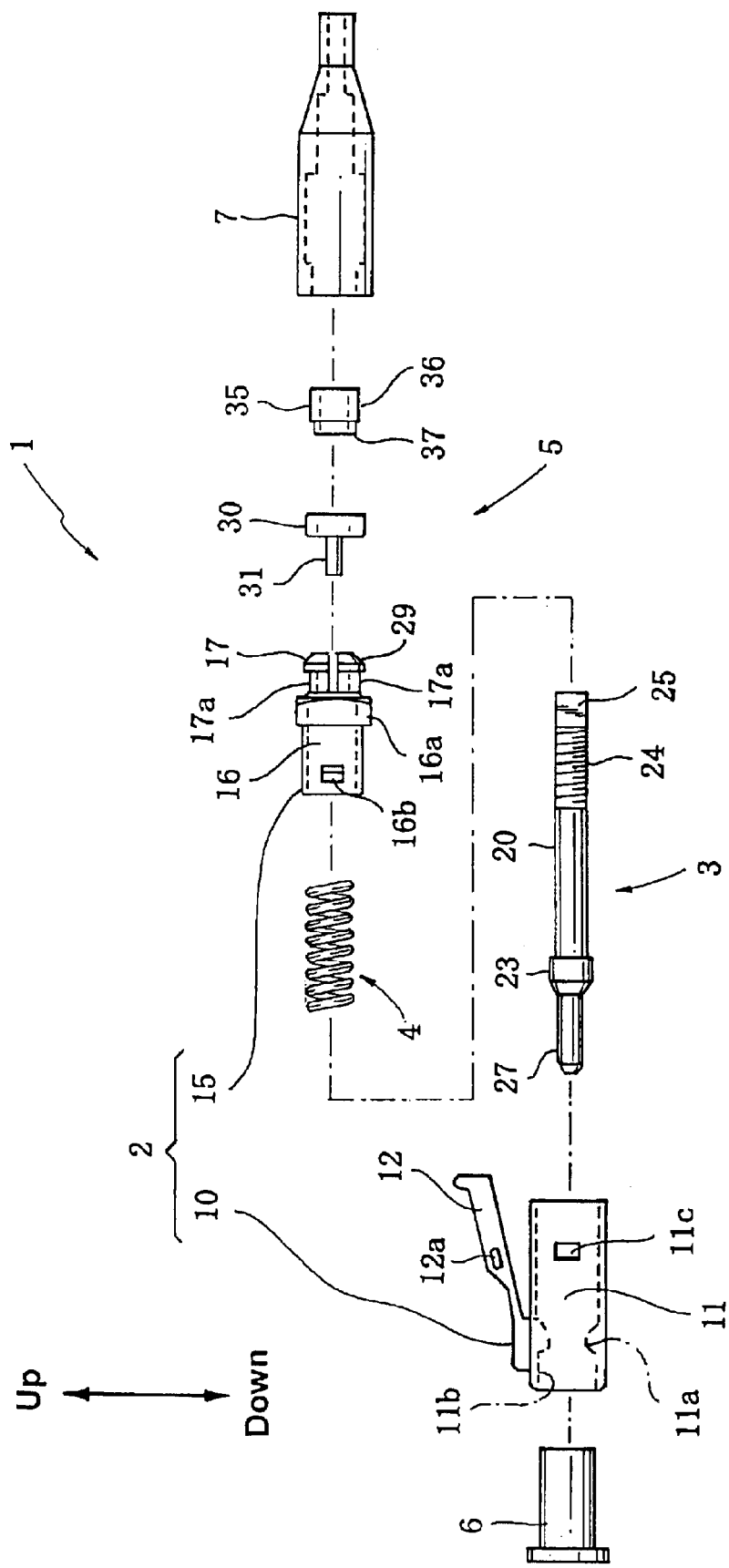
FIG. 1 is an exploded side elevational view of an optical fiber connector according to an embodiment of the present invention.

The embodiments of the present invention will be described with reference to the accompanying drawings. In this embodiment, the present invention is implemented for an optical fiber connector attached to the leading end of an optical fiber to provide an optical connection between optical fibers via an adapter. The up and down directions referenced in the following description are shown in FIG. 1.

Figure 8:
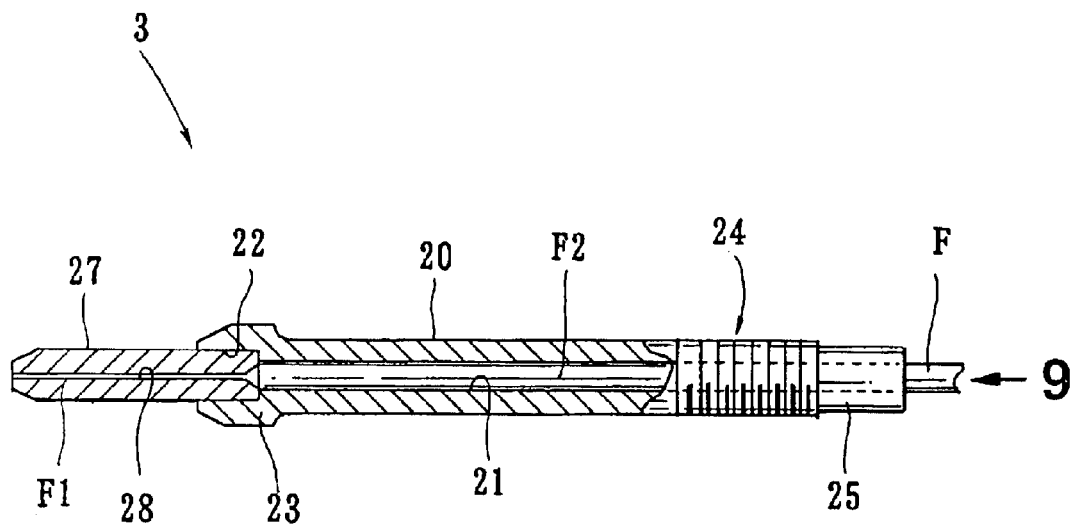
FIG. 8 is a cross-sectional view of a ferrule.
Figure 17:
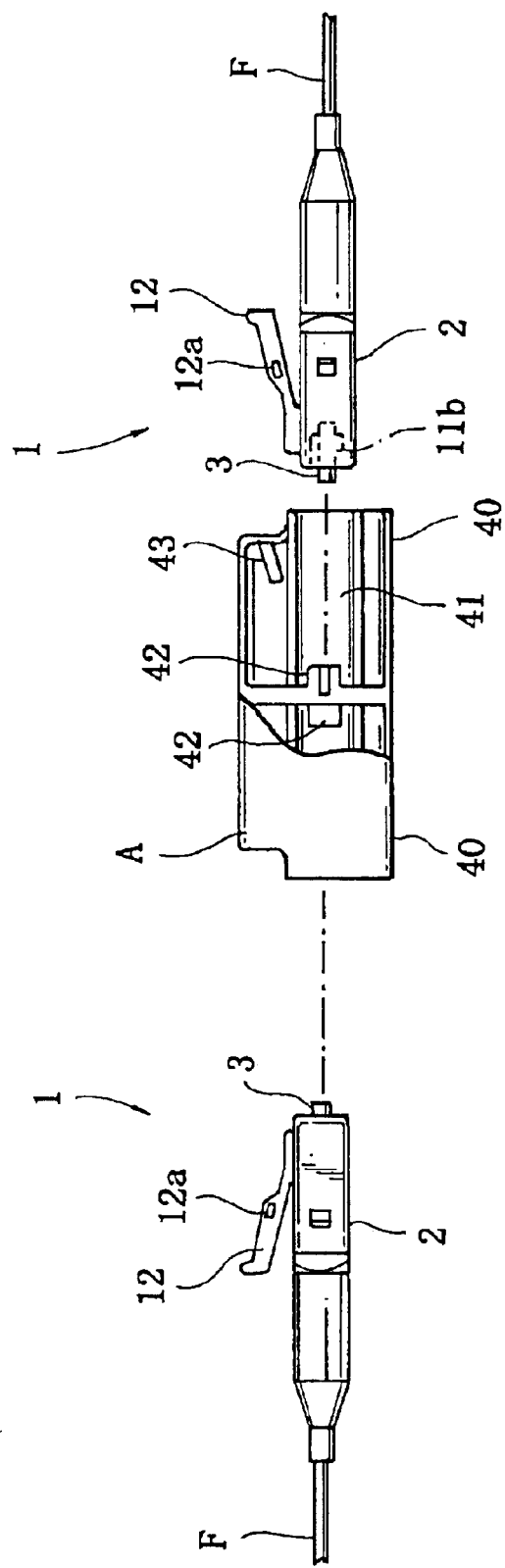
FIG. 17 is a side elevational view with a partial cross section of an adapter and an optical fiber connector.

As shown in FIGS. 1–5, an optical fiber connector 1 (hereinafter referred to as the connector 1) comprises: a housing 2 that can be attached to or removed from an adapter A (as shown in FIG. 17); a ferrule 3 supporting a cladding portion F1 at the leading end of an optical fiber F inserted through the ferrule 3 (as shown in FIG. 8) housed in the housing 2 so that it can move along the axis and so that it can rotate during the assembly process; a compression coil spring 4 mounted inside the housing 2 and biasing the ferrule 3 along the axis toward the leading end; and a rotation-restricting slide mechanism 5, disposed toward the base end of the housing 2, restricting the ferrule 3 from rotating relative to the housing 2 and allowing the ferrule 3 to slide along the axis.

The housing 2 comprises a main housing body 10 that can be attached to or removed from the adapter A and that is formed from a synthetic resin; and an extender cap 15 formed from a synthetic resin and engaged with the base end of the main housing body 10.

The main housing body 10 comprises: a cylindrical section 11 having a polygonal outer perimeter shape; and a lever 12 extending diagonally upward from the leading end of the cylindrical section 11 to the base end. An inner collar 11a is formed inside the cylindrical section 11. A cylindrical insertion hole 11b is formed at the leading side of the inner collar 11a. A pair of engagement holes 11c are formed at the base-end section of the cylindrical section 11. The lever 12 has appropriate elasticity along the up/down direction, and a pair of engagement projections 12a are formed on the lever 12.

Figure 6:
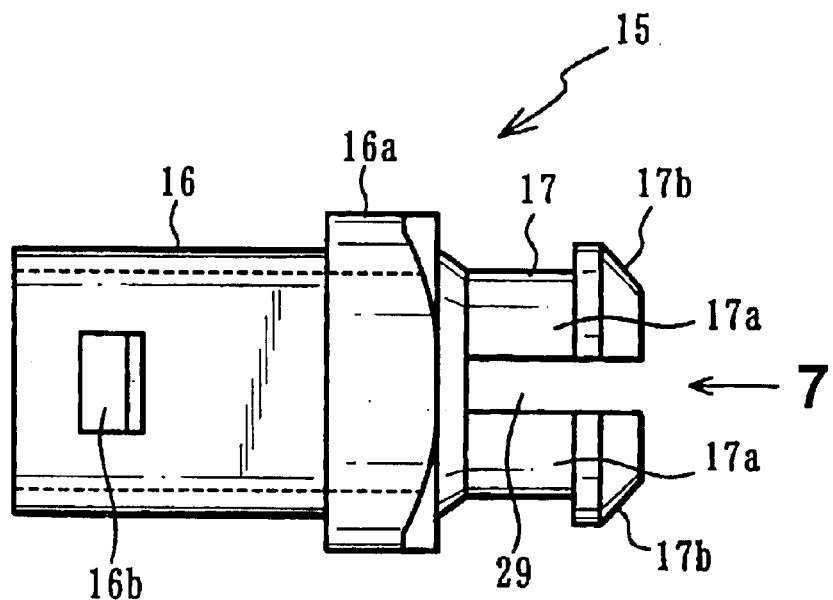
FIG. 6 is a side elevational view of an extender cap.
Figure 7:
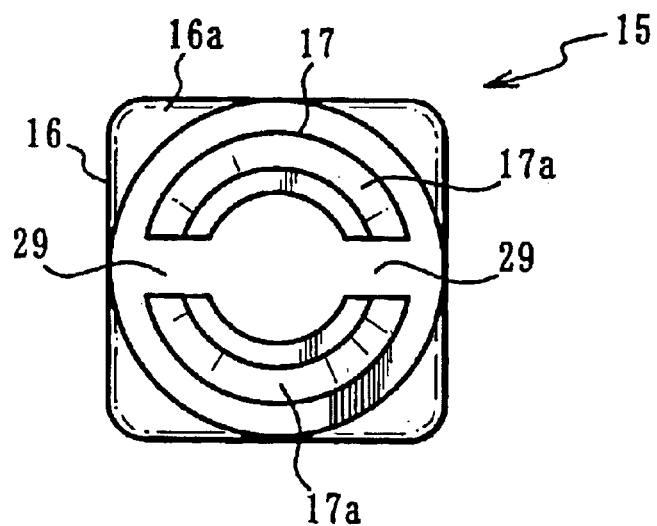
FIG. 7 is an elevational view of the extender cap of FIG. 6 as seen from arrow 7 of FIG. 6.

As shown in FIGS. 6 and 7, an extender cap 15 comprises: a cylindrical section 16; and a rotation restricting section 17 formed toward the base end of the cylindrical section 16. A collar 16a having the same outer perimeter shape as the cylindrical section 11 of the main housing body 10 is formed at the base end of the cylindrical section 16. A pair of engagement claws 16b is formed on the outer perimeter surface of the leading end section of the cylindrical section 16. The rotation restriction section 17 comprises a pair of semi-circular cylindrical sections 17a. A taper is formed at a large-diameter section 17b at the base end of each semi-circular cylindrical section 17a.

The cylindrical section 16 is pressed inside the cylindrical section 11 of the main housing body 10. With the collar 16a abutting the base-end surface of the cylindrical section 11, the pair of engagement claws 16b engage with the pair of engagement holes 11c so that the extender cap 15 engages with the main housing body 10. A pair of slits 29 in the rotation-restricting slide mechanism 5 are formed between the pair of semicircular cylindrical sections 17a of the rotation restricting section 17 of the extender cap 15.

Figure 9:
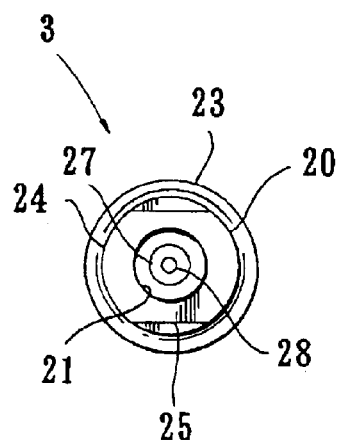
FIG. 9 is an elevational view of the ferrule of FIG. 8 as seen from arrow 9 of FIG. 8.

As shown in FIGS. 8 and 9, the ferrule 3 comprises a main ferrule body 20 (e.g., approximately 18 mm long) formed from a stainless steel; and a cylinder 27 formed from zirconia (e.g., with a 1.3 mm diameter and a length of approximately 5 mm).

A fiber insertion hole 21 (e.g., with a diameter of 1 mm) is formed on the main ferrule body 20, and a fitting hole 22 having a larger diameter than the fiber insertion hole 21 is formed at the leading end of the main ferrule body 20. The base-end section of the cylinder 27 fits and is secured inside the fitting hole 22. A fiber insertion hole 28 (e.g., with a diameter of 127 microns) in the cylinder 27 is continuous with the fiber insertion hole 21 in the main ferrule body 20.

The surface covering at the leading end of the optical fiber F is peeled away to expose the cladding portion F1. The cladding portion F1 is inserted into the fiber insertion hole 28 of the cylinder 27. A core F2, which includes the surface covering toward the base-end side of the cladding portion F1, is inserted into the fiber insertion hole 21 of the main ferrule body 20 so that the end of the core F2 abuts the cylinder 27. Then, the cylinder 27 and the end surface of the cladding portion F1 are polished to be co-planar.

With the ferrule 3 housed in the housing 2, the leading end of the cylinder 27 is projected forward slightly from the housing 2. Also, the main ferrule body 20 is inserted into the extender cap 15 so that it projects toward the base-end side of the housing 2. A base-end screw 24 is formed on the section of the main ferrule body 20 that projects toward the base-end side of the housing 2.

A rotation operation section 25 used to rotate the ferrule 3 is formed by beveling the base-end screw 24. Since the flange 23 can be engaged with the inner collar 11a when the ferrule 3 is housed in the housing 2, the ferrule 3 cannot slip out from the leading end of the housing 2.

Figure 5:
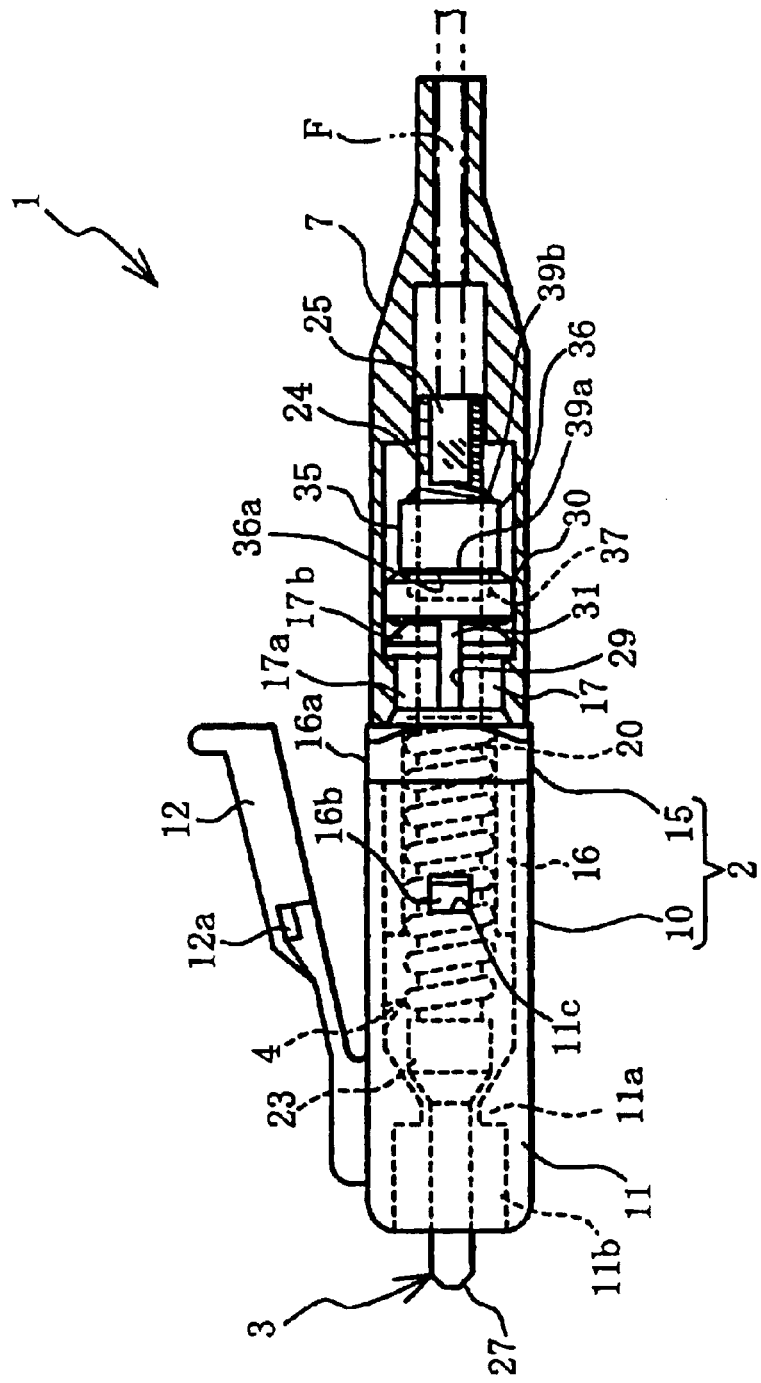
FIG. 5 is a side elevational view with a partial cross section of an optical fiber connector.

As shown in FIGS. 1 and 5, the compression coil spring 4 fits onto the main ferrule body 20 and is interposed between the extender cap 15 and the flange 23 of the ferrule 3. Most of the compression coil spring 4 is housed in the cylinder 16 of the extender cap 15.

Figure 2:
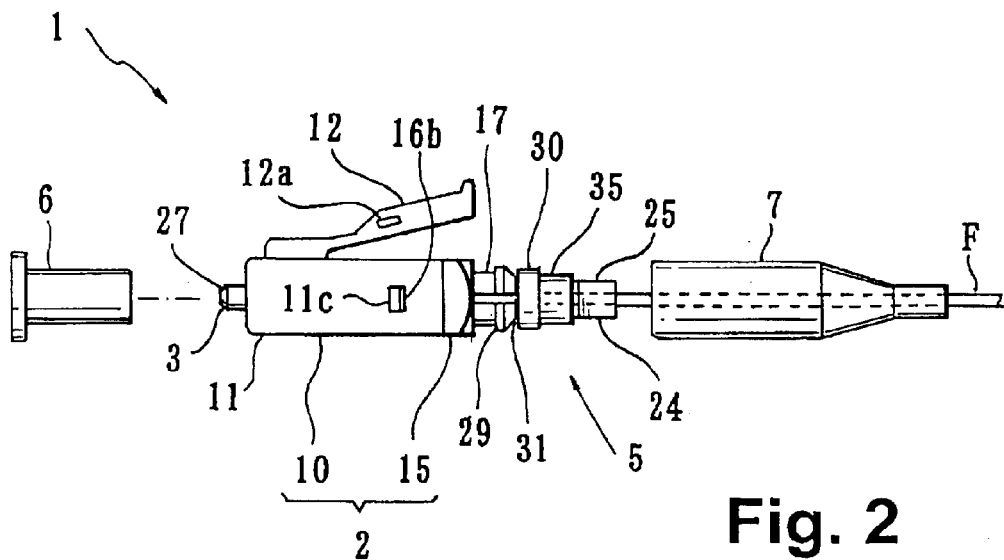
FIG. 2 is a side elevational view of an optical fiber connector with the cap and boot removed.
Figure 3:
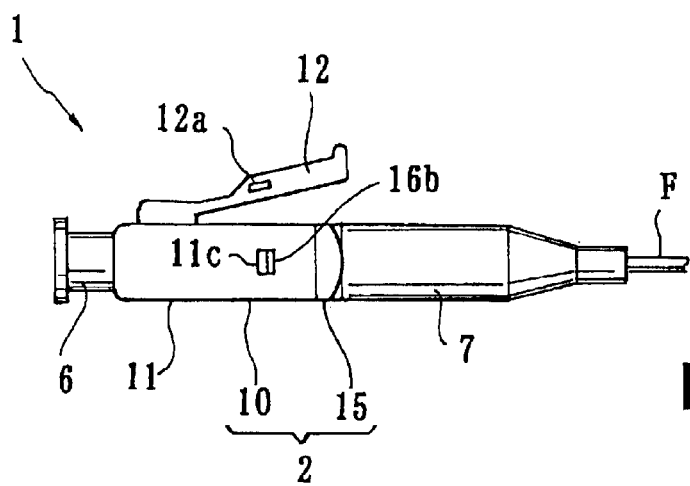
FIG. 3 is a side elevational view of an optical fiber connector with the cap and boot mounted.
Figure 4:
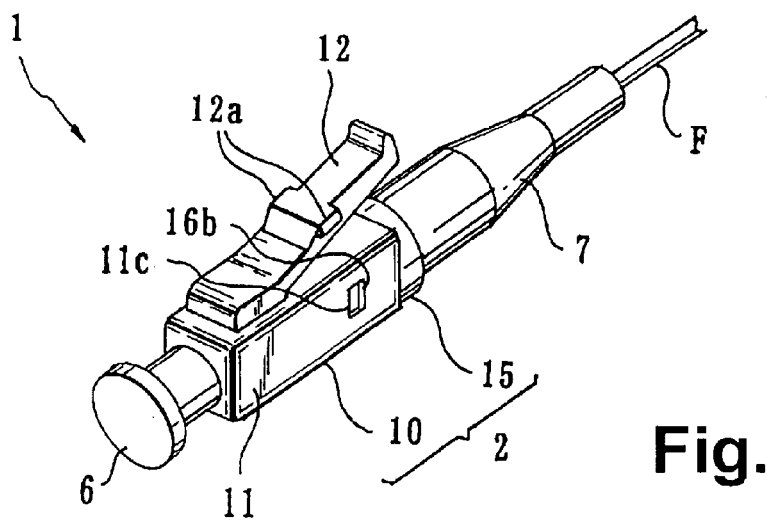
FIG. 4 is a perspective view of an optical fiber connector.

As shown in FIGS. 1, 2, and 5, the rotation-restricting slide mechanism 5 comprises: a pair of axially-oriented slits 29 formed on the extender cap 15; a metal key member 30 fitting onto the base-end screw 24 of the ferrule 3 and formed with a pair of keys 31 slidably engaging with the slits 29; a metal adjustment nut 35 abutting the base-end surface opposite from the keys 31 of the key member 30 and fitting onto the base-end screw 24 of the ferrule 3; a first adhesive section 39a securing the adjustment nut 35 and the key member 30; and a second adhesive section 39b securing the ferrule 3 and the adjustment nut 35.

Figure 10:
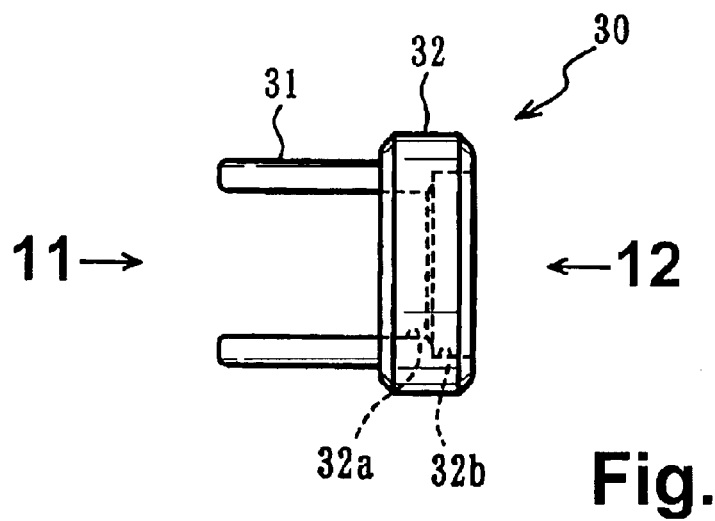
FIG. 10 is a plan view of a key member.
Figure 11:
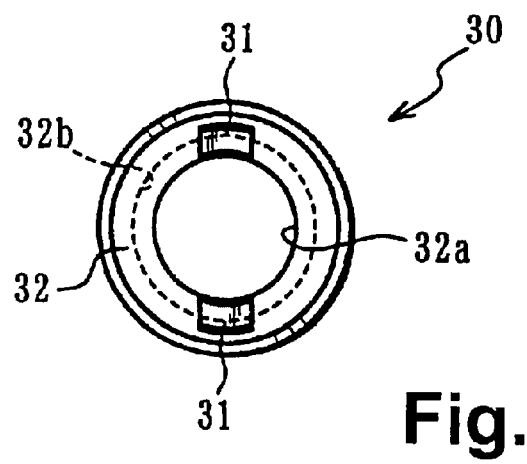
FIG. 11 is an elevational view of the key member of FIG. 10 as seen from arrow 11 of FIG. 10.
Figure 12:
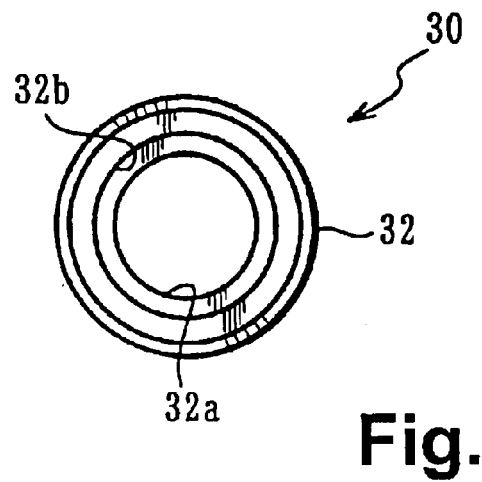
FIG. 12 is an elevational view of the key member of FIG. 10 as seen from arrow 12 of FIG. 10.
Figure 13:
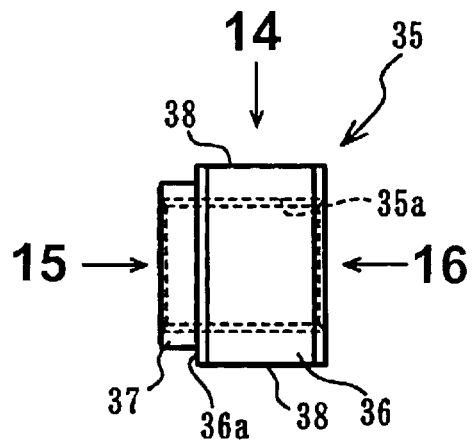
FIG. 13 is a side elevational view of an adjustment nut.
Figure 14:
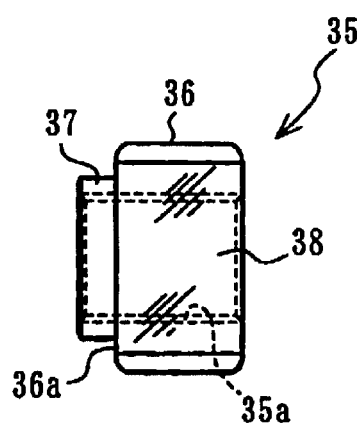
FIG. 14 is an elevational view of the adjustment nut of FIG. 13 as seen from arrow 14 of FIG. 13.
Figure 15:
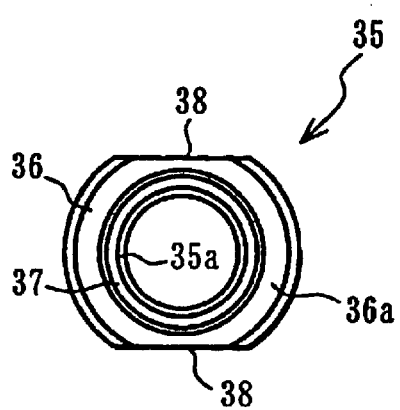
FIG. 15 is an elevational view of the adjustment nut of FIG. 13 as seen from arrow 15 of FIG. 13.
Figure 16:
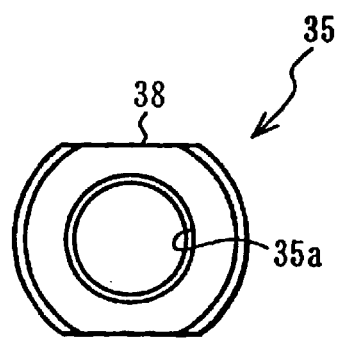
FIG. 16 is an elevational view of the adjustment nut of FIG. 13 as seen from arrow 16 of FIG. 13.

The pair of slits 29 are formed at axially-symmetrical opposing positions. As shown in FIGS. 10–12, the key member 30 comprises a pair of keys 31 and a ring 32. The pair of keys 31 are formed at axially symmetrical positions and are extended from the ring 32 along the axis toward the end. An insertion hole 32a is formed in the ring 32, and an insertion hole 32b having a larger diameter than the insertion hole 32a is formed at the base-end side of the insertion hole 32a.

As shown in FIGS. 13–16, the adjustment nut 35 comprises a main nut body 36 with flat portions 38 and a small-diameter nut section 37 having a smaller diameter than the main nut body 36. The small-diameter nut section 37 is positioned toward the leading end of the main nut body 36. A threaded groove 35a is formed on the inner perimeter sections of the main nut body 36 and the small-diameter nut section 37. The small-diameter nut section 37 is inserted into the insertion hole 32b in the ring 32 of the key member 30, and a shelf 36a at the leading end of the main nut body 36 abuts the base-end surface of the ring 32 of the key member 30.

The first adhesive section 39a is formed by hardened adhesive applied between the key member 30 and the adjustment nut 35. The second adhesive section 39b is formed by hardened adhesive applied between the ferrule 3 and the adjustment nut 35.

As shown in FIGS. 1–4 and the like, if the connector 1 is not connected to the adapter A, a cap 6 covering the cladding portion F1 and the like can be inserted in the cylindrical insertion hole 11b of the housing 2. Also, a rubber boot 7 covering the rotation restricting slide mechanism 5 is mounted so that the boot 7 engages with the rotation restricting section 17.

As shown in FIG. 17, the adapter A is formed by connecting a pair of opposing split adapter members 40. Each of the split adapter members 40 comprises: a housing storage section 41; a cylindrical section 42 formed at the far surface from the housing storage section 41; and a pair of slide sections 43 formed above the housing storage section 41.

To connect the connector 1 to the adapter A, the housing 2 is inserted into the housing storage section 41. When the housing 2 is completely housed in the housing storage section 41, the cylindrical section 42 is inserted into the cylinder insertion hole 11b of the housing 2 and the cylinder 27 of the ferrule 3 is inserted into the cylindrical section 42.

When the housing 2 is inserted into the housing storage section 41, the pair of engagement projections 12a on the lever 12 are pushed downward by the pair of slide sections 43. More specifically, the lever 12 is elastically deformed downward and when the housing 2 is completely housed in the housing storage section 41, the lever 12 is restored so that the pair of engagement projections 12a engages with the pair of slide sections 43 to prevent slippage of the connector 1.

When two connectors 1 are connected to both ends of the adapter A, the end surfaces of the ferrules 3 are pushed together by the compression coil spring 4. Thus, the end surfaces of the two cladding portions F1 abut each other and are connected, and this connection is maintained in a stable manner. When separating the connectors 1 from the adapter A, the lever 12 is pushed downward to release the engagement of the engagement projections 12a and the slide sections 43, thereby allowing the connector 1 to be slipped out from the adapter A.

Next, a method for assembling the connector 1 will be described.

It is assumed that the main housing body 10, the extender cap 15, the ferrule 3, the compression coil spring 4, the key member 30, the adjustment nut 35, and the like are produced using predetermined, widely known methods before the connector 1 is assembled. The steps for assembling the connector 1 are indicated by Pi (i=1, 2, 3, . . . ).

Figure 18:
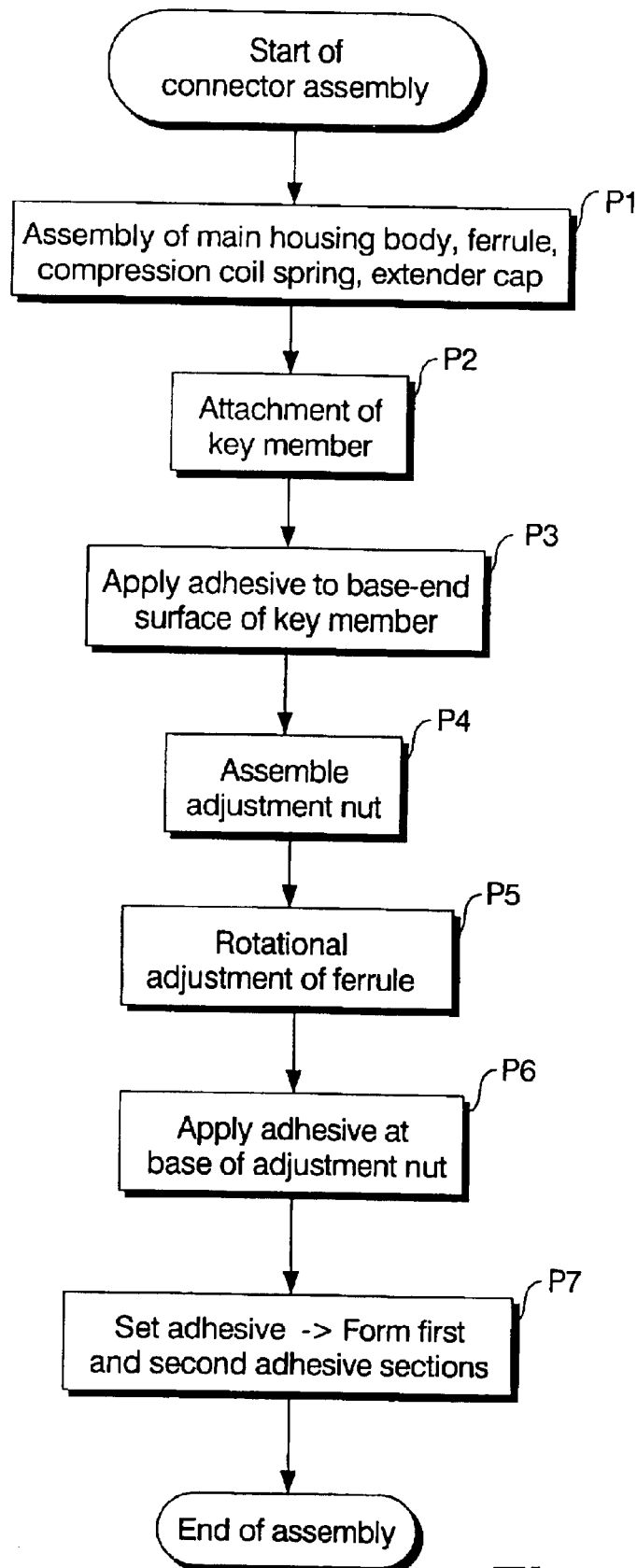
FIG. 18 is a process diagram for the assembly of an optical fiber connector.

As shown in FIG. 18, at step P1, the main housing body 10, the extender cap 15, the ferrule 3, and the compression coil spring 4 are assembled. At this step, the ferrule 3 is housed in the housing 2 so that it can be rotated relative to the housing 2. Next, at step P2, the key member 30 fits onto the base-end screw 24 of the ferrule 3, and the keys 31 are engaged with the slits 29 of the extender cap 15.

Next, at step P3, adhesive is applied to the base-end surface of the key member 30 and its vicinity. At step P4, the adjustment nut 35 is fit onto the base-end screw 24 of the ferrule 3 before the adhesive sets. When assembling this adjustment nut 35, the flange 23 of the ferrule 3 is biased toward the leading end and engages with the inner collar 11a of the housing 2. The adjustment nut 35 is abutted against the key member 30 so that the there is maximum engagement between the slit 29 and the key 31.

Also, before the adhesive applied at step P3 sets, the ferrule 3 is rotated for adjustment at step P5. The rotation operation section 25 is supported and rotated using a rotating tool or the like while the optical transmission rate is measured from the leading end of the ferrule 3 using an optical characteristic measuring tool. The ferrule 3 is positioned so that optical loss is minimized.

Next, at step P6, adhesive is applied between the adjustment nut 35 and the base-end screw 24 of the ferrule 3. Finally, while the ferrule 3 and the adjustment nut 35 are fixed in position at step P7, the adhesive applied at steps P3 and P6 is set in order to form the first and the second adhesive sections 39a, 39b, thereby completing the assembly process and producing the connector 1.

With this connector 1, the rotation restricting slide mechanism 5 prevents the ferrule 3 positioned toward the base end of the housing 2 from rotating relative to the housing 2 and also allows the ferrule 3 to slide along the axis. As a result, while the connector 1 is assembled, the ferrule 3 can be rotated 360° around the axis in a non-stepping manner in order to provide a high-precision optical connection between the optical fibers F.

The housing 2 comprises the main housing body 10, which is attachable to and removable from the adapter A, and an extender cap 15, which engages and connects to the base end of the main housing body 10. When the housing 2, the ferrule 3, and the compression coil spring 4 are assembled, the ferrule 3 and the compression coil spring 4 are stored in the main housing body 10 while the main housing body 10 and the extended cap 15 are separated. Then, the extender cap 15 is engaged with and connected to the main housing body 10, thereby allowing easy assembly and allowing the simple and reliable rotational adjustment of the ferrule 3 relative to the housing 2.

The ferrule 3 comprises the base-end screw 24, which is inserted through the extender cap 15 and projects from the base-end side of the housing 2. The rotation-restricting slide mechanism 5 comprises the slits 29 formed on the extender cap 15, the key member 30, the adjustment nut 35, and the first and second adhesive sections 29a, 29b. This rotation-restricting slide mechanism 5 reliably restricts the rotation of the ferrule 3 relative to the housing 2 while allowing reliable sliding motion along the axis.

The rotation operation section 25 is formed on the base-end screw 24 of the ferrule 3 so that the rotation operation section 25 can be held with a rotating tool and the ferrule 3 can be easily rotated for adjustment relative to the housing 2 while observing the end of the ferrule 3. After adjustments are made, the key member 30, the adjustment nut 35, and the like can be assembled to easily form the rotation-restricting slide mechanism 5.

In addition to the first adhesive section 39a, which secures the adjustment nut 35 and the key member 30, the rotation-restricting slide mechanism 5 comprises the second adhesive section 39b, which secures the ferrule 3 and the adjustment nut 35. Thus, the ferrule 3 is reliably prevented from rotating relative to the housing 2.

Thus, in order to provide an optical connection between the optical fibers F that has a high degree of precision, a rotation-restricting slide mechanism 5 is disposed toward the base end of the housing 2, and the ferrule 3 can be rotationally adjusted by desired degree less than 360° in a non-stepping manner around the axis. Thus, the rotational phase can be adjusted to provide maximum optical transmission, while the assembly process, including the rotational adjustment, can be simple and reliable.

While not shown in the figures, polarization-retaining fibers comprise cladding portion, a core, and a stress application section (e.g., a quartz glass with additives; formed from $B_2O_3$). Light is transmitted while retaining a predetermined polarization. Thus, when connecting these polarization-retaining optical fibers, these polarization-retaining optical fibers must be adjusted for predetermined rotational phases (i.e., rotational phases that minimize polarization cross-talk) so that light can be transmitted while polarization is maintained.

In this case, for example, the cladding portion of the polarization-retaining optical fiber can be connected to the connector 1 so that it is prevented from rotating. When assembling this connector 1, the ferrule 3 can be rotationally adjusted around the axis to provide a predetermined rotational phase for the polarization-retaining optical fiber. As a result, polarization-retaining optical fibers can be connected so that light is transmitted with the predetermined polarization reliably maintained. Compared to conventional technologies that use a jig to rotationally adjust the ferrule from the leading free end, the present invention allows the ferrule 3 to be rotationally adjusted from the base end. Thus, when the connector is used for polarization-retaining optical fibers, rotational adjustments can be made in a non-stepping manner while observing the leading free end surface of the ferrule 3.

Other modifications may be effected without departing from the spirit of the present invention, and the present invention can be implemented for different types of optical fiber connectors.

Next, an optical fiber connector according to another embodiment of the present invention will be described. Since the adapter A and the optical fiber F are identical to those from the embodiment described above, like numerals will be used and the corresponding descriptions will be omitted. Also, the up and down directions indicated in FIG. 19 will be used as references in the description.

As shown in FIGS. 19–31, the optical fiber connector 1A (hereinafter referred to as the connector 1A) comprises a housing 2A, a ferrule 3A, a compression coil spring 4A, a rotation-restricting slide mechanism 5A, and the like. The housing 2A is attachable to and removable from the adapter A. A cladding portion F1 at the end of the optical fiber F is inserted through the ferrule 3A. The ferrule 3A provides support and is housed in the housing 2A so that the ferrule 3A can move axially and can rotate during the assembly process. The compression coil spring 4A is mounted in the housing 2A and biases the ferrule 3A toward the leading end in the axial direction of the housing 2A. The rotation-restricting slide mechanism 5A restricts the rotation of the ferrule 3A relative to the housing 2A at the base-end side of the housing 2A and allows the ferrule 3A to slide along the axial direction.

Figure 19:
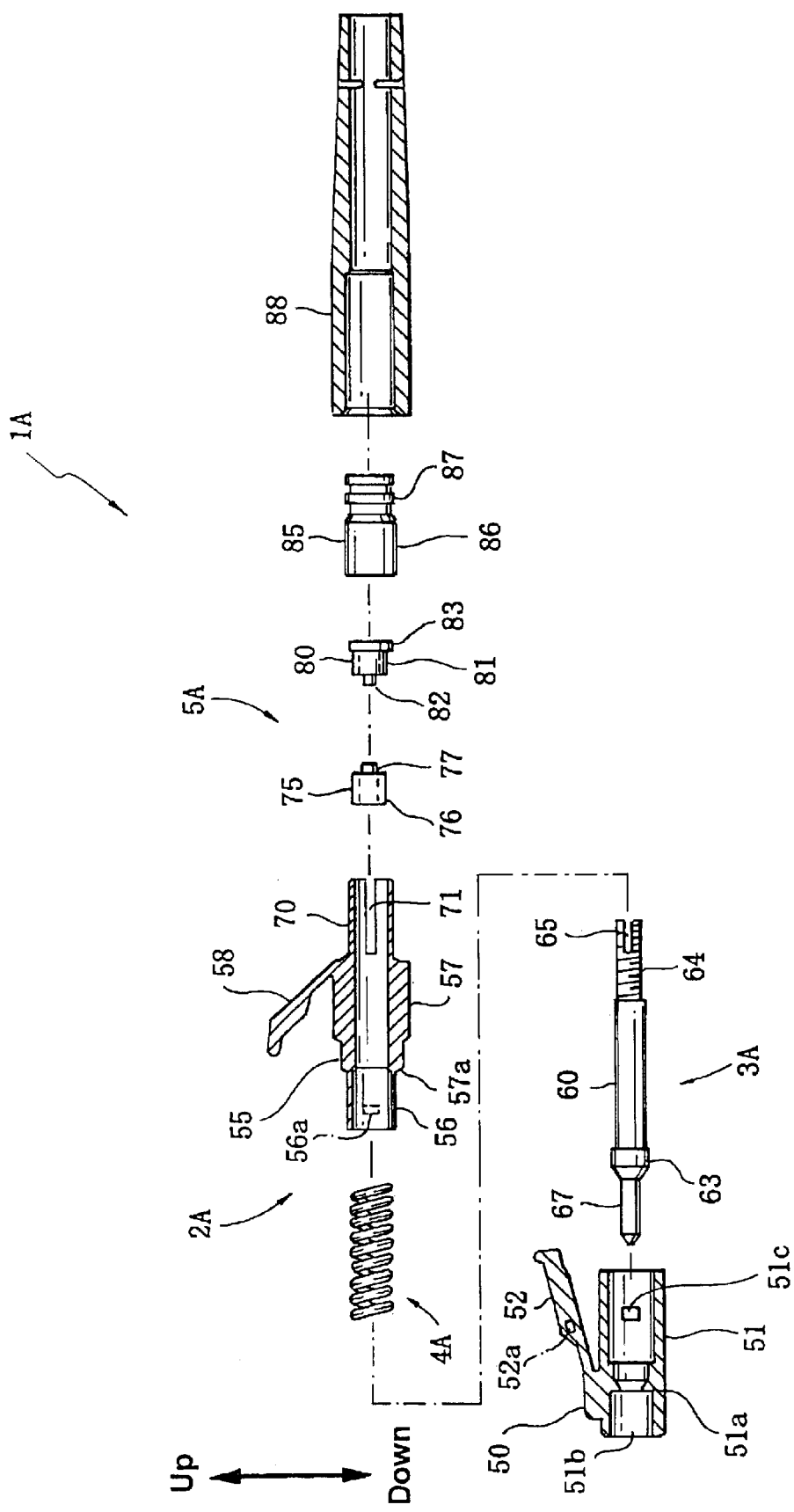
FIG. 19 is an exploded side elevational view of an optical fiber connector according to another embodiment of the present invention.
Figure 20:
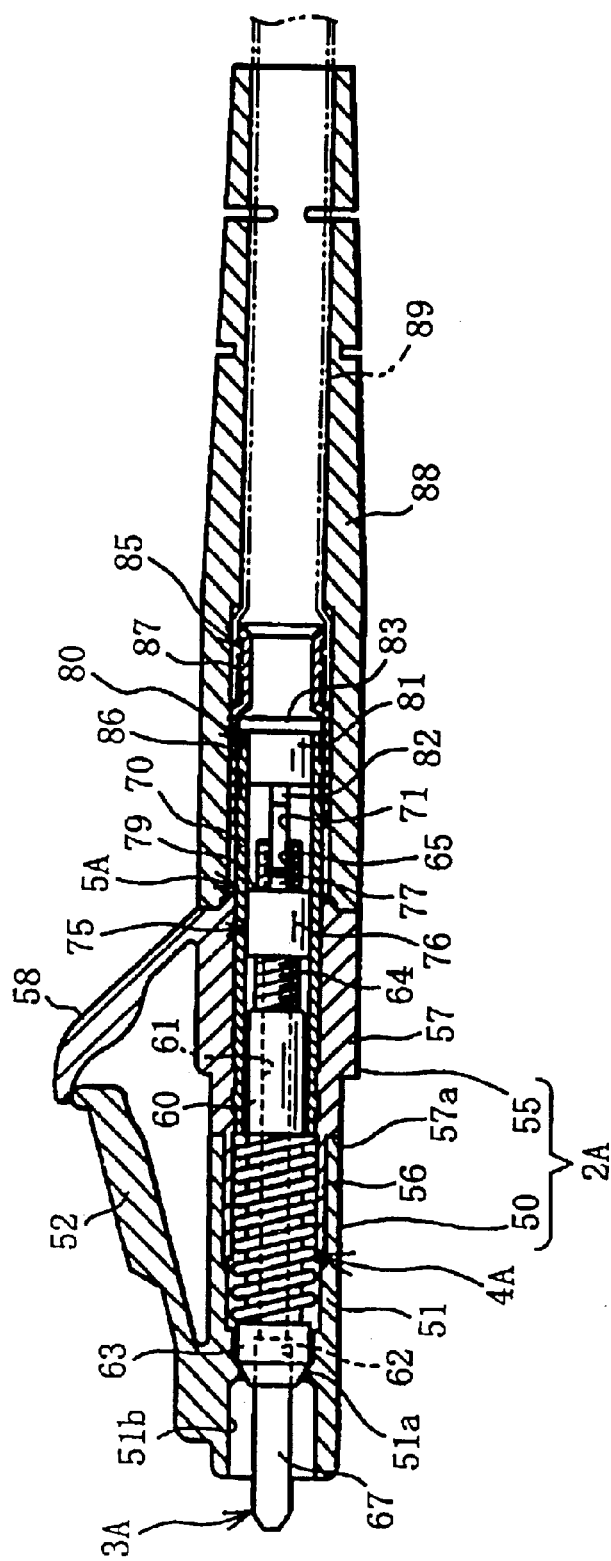
FIG. 20 is a vertical cross-sectional view of an optical fiber connector.

As shown in FIGS. 19 and 20, the housing 2A comprises a main housing body 50 and a synthetic resin extender cap 55. The main housing body 50 is formed from a synthetic resin and is attachable to and detachable from the adapter A. The synthetic resin extender cap 55 can engage with and be joined to the base end of the main housing body 50.

The main housing body 50 has a structure similar to that of the main housing body 10 of the embodiment described above and comprises a cylindrical section 51 and a lever section 52. The cylindrical section 51 comprises an inner collar 51a, a cylindrical insertion opening 51b, and a pair of engagement holes 51c. A pair of engagement projections 52a are formed on the lever section 52 of the main housing body 50.

Figure 21:
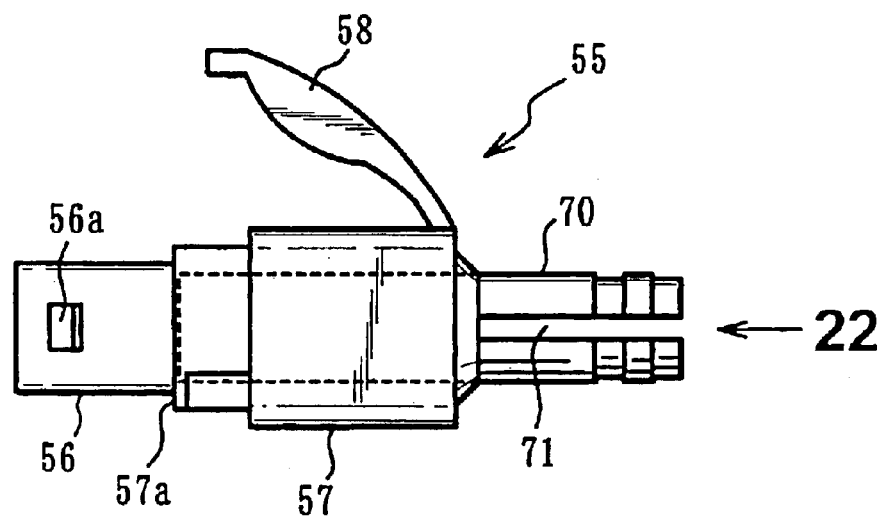
FIG. 21 is a side elevational view of an extender cap.
Figure 22:
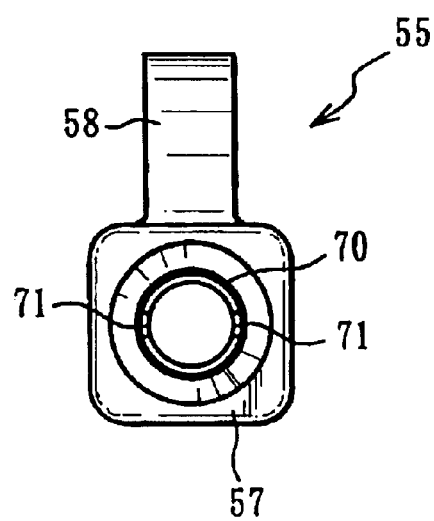
FIG. 22 is an elevational view of the extender cap of FIG. 21 as seen from arrow 22 of FIG. 21.

As shown in FIGS. 21 and 22, the extender cap 55 comprises a first cylindrical section 56 with a polygonal outer shape, a second cylindrical section 57 also with a polygonal outer shape, and a lever section 58. The second cylindrical section 57 is disposed at the base end of the first cylindrical section 56. The lever section 58 extends upward and diagonally from an upper section of the second cylindrical section 57 from the base end to the leading end. A retention member 70 of the rotation-restricting slide mechanism 5A fits inside and is secured to the extender cap 55.

The retention member 70 is formed from a metallic material. The length of the retention member 70 is approximately twice the length of the second cylindrical section 57 of the extender cap 55. The second cylindrical section 57 of the extender cap 55 fits and is secured onto the leading half of the retention member 70. The base-end half of the retention member 70 projects from the base end of the extender cap 55.

A pair of engagement claws 56a are located on the outer perimeter surface of the first cylindrical section 56 of the extender cap 55. The outer diameter of the base end of the second cylindrical section 57 is larger than the outer diameter of the first cylindrical section 56. A shelf 57a is located at the boundary between the first cylindrical section 56 and the second cylindrical section 57.

The first cylindrical section 56 of the extender cap 55 fits tightly inside the cylindrical section 51 of the main housing body 50. The pair of engagement claws 56a engage with the pair of engagement openings 51c while the shelf 57a abuts the base-end surface of the cylindrical section 51. Thus, the extender cap 55 engages and connects to the main housing body 50.

Figure 23:
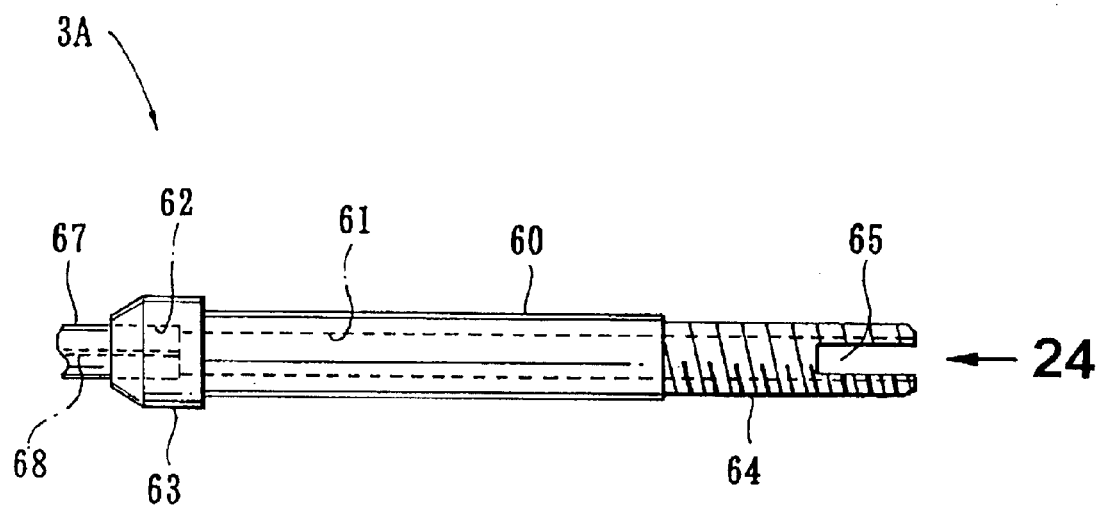
FIG. 23 is a side elevational view of a ferrule.
Figure 24:
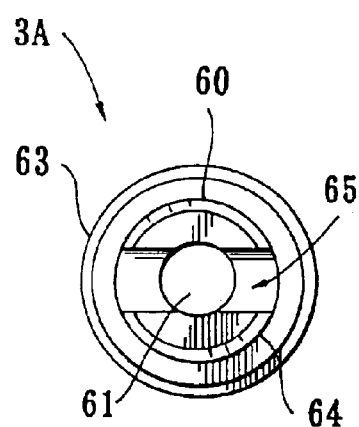
FIG. 24 is an elevational view of the ferrule of FIG. 23 as seen from arrow 24 of FIG. 23.

As shown in FIGS. 23 and 24, the ferrule 3A comprises a stainless steel main ferrule body 60 and a cylindrical body 67 formed from zirconia, thereby essentially having the same structure as the ferrule 3 from the embodiment described above.

More specifically, the main ferrule body 60 comprises a fiber insertion opening 61, a fitting hole 62, a flange 63, and a base-end threaded section 64. The base-end threaded section 64 is inserted through the extender cap 55 and extends toward the base end of the housing 2A. The base-end section of the cylindrical body 67 fits into the fitting hole 62 securely. The cylindrical body 67 is formed with a fiber insertion opening 68.

A rotation operation section 65 is located on the base-end threaded section 64 and allows the ferrule 3 to rotate. The rotation operation section 65 comprises a pair of axially oriented slits positioned symmetrical relative to the axis on the base-end threaded section 64.

As shown in FIGS. 19 and 20, the compression coil spring 4A fits onto the main ferrule body 60 of the ferrule 3A and is interposed between the flange 63 and the retention member 70. The leading end of the retention member 70 is positioned near the boundary between the first cylindrical section 56 and the second cylindrical section 57 of the extender cap 55. A section of the compression coil spring 4A is housed in the first cylindrical section 56.

As shown in FIGS. 19 and 20, the rotation-restricting slide mechanism 5A comprises the metal retention member 70, a pair of axial slits 71 on the retention member 70; a metal adjustment nut 75; and an adhesive section 79. The ferrule 3A is inserted through the retention member 70, which is securely disposed on the extender cap 55. The metal adjustment nut 75 movably housed in the retention member 70, and the adhesive section 79 secures the adjustment nut 74 to the ferrule 3A.

The pair of slits 71 are formed on the retention member 70 at axially symmetrical positions and extend from the extender cap 55 to the base-end half of the retention member 70 which projects toward the base end.

Figure 25:
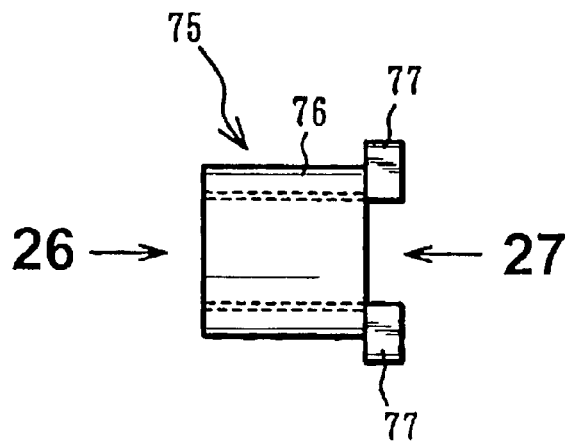
FIG. 25 is a plan view of an adjustment nut.
Figure 26:
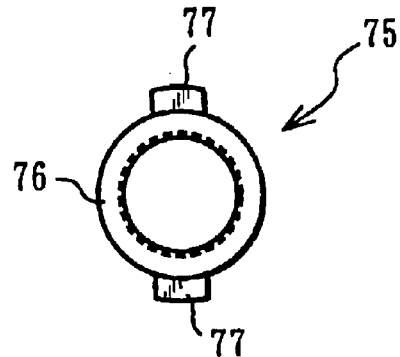
FIG. 26 is an elevational view of the adjustment nut of FIG. 25 as seen from arrow 26 of FIG. 25.
Figure 27:
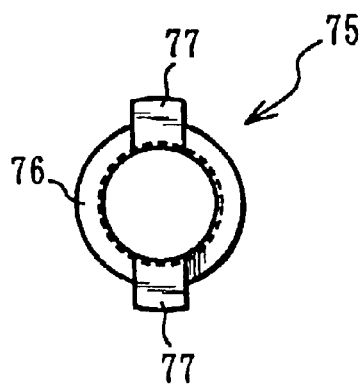
FIG. 27 is an elevational view of the adjustment nut of FIG. 25 as seen from arrow 27 of FIG. 25.
Figure 28:
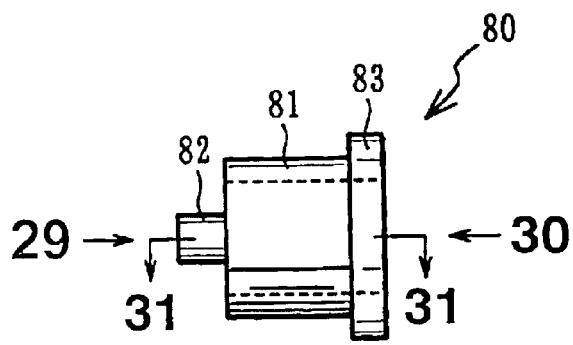
FIG. 28 is a side elevational view of a reinforcement ring.
Figure 29:
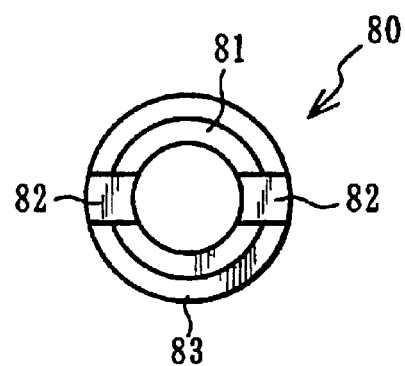
FIG. 29 is an elevational view of the reinforcement ring of FIG. 28 as seen from arrow 29 of FIG. 28.
Figure 30:
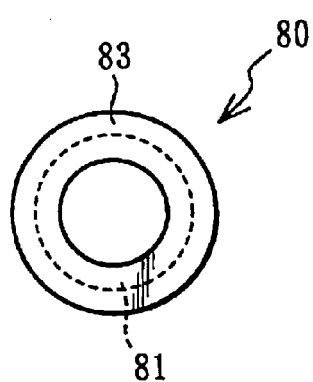
FIG. 30 is an elevational view of the reinforcement ring of FIG. 28 as seen from arrow 30 of FIG. 28.
Figure 31:
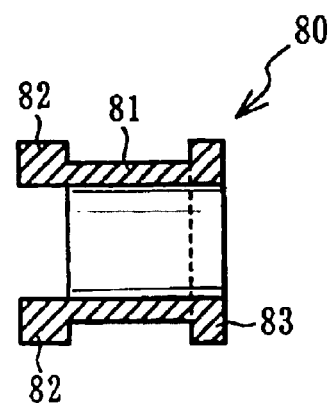
FIG. 31 is a cross-sectional view taken along line 31—31 of FIG. 28.

As shown in FIGS. 25–27, the adjustment nut 75 comprises a nut section 76 and a pair of keys 77 formed integrally with each other. The nut section 76 fits onto the base-end threaded section 64 of the ferrule 3A. The pair of keys 77 slidably engages with the pair of slits 71 of the retention member 70. The nut section 76 is inserted in the retention member 70 and is guided so that it can move along the axial direction. The pair of keys 77 are formed at axially symmetrical positions on the base-end side of the nut section 76 and project radially outward from the nut section 76.

The adhesive section 79 is formed by setting an adhesive which is applied between the adjustment nut 75 and the base-end threaded section 64 of the ferrule 3A.

As shown in FIGS. 19 and 20, the connector 1A further comprises a boot 88, an attachment sleeve 85, and a reinforcement ring 80 secured to the base-end side of the retention member 70.

As shown in FIGS. 19, 20, and 28–31, the reinforcement ring 80 is formed from a metallic material and comprises a cylinder 81, a pair of claws 82, and a collar 83. The pair of claws 82 are disposed at the leading end of the cylinder 81 and are positioned symmetrically to each other relative to the axis. The collar 83 is disposed at the base end of the cylinder 81. The cylinder 81 is pushed into the base end of the retention member 70 and the pair of claws 82 engages with the pair of slits 71 so that the collar 83 abuts against and is secured by the base-end surface of the retention member 70.

As shown in FIGS. 19 and 20, the attachment sleeve 85 is formed from a metallic material and comprises a large-diameter cylinder section 86 and a small-diameter cylinder section 87. The large-diameter cylinder section 86 is secured by being fitted and locked onto the outside of the base-end section of the retention member 70. When the attachment sleeve 85 is secured by being fitted and locked to the outside of the retention member 70, the reinforcement ring 80 provides reinforcement so that the retention member 70 is not crushed. The end of the boot 88 fits and is secured onto the outside of the large-diameter cylinder section 86 of the attachment sleeve 85. The boot 88 covers the attachment sleeve 85 and the base-end half of the retention member 70 which projects from the extender cap 55 to the base-end side of the connector 1A.

Next, a method for making the connector 1A will be described.

The main housing body 50, the extender cap 55, the ferrule 3A, the compression coil spring 4A, the adjustment nut 75, the reinforcement ring 80, the attachment sleeve 85, and the like are made using predetermined, well-known methods. These elements are made before the connector 1A is assembled. The assembly of the connector 1A will be described using the process diagram shown in FIG. 32 in which PiA (i=1, 2, 3, . . . ) indicates the individual steps.

Figure 32:
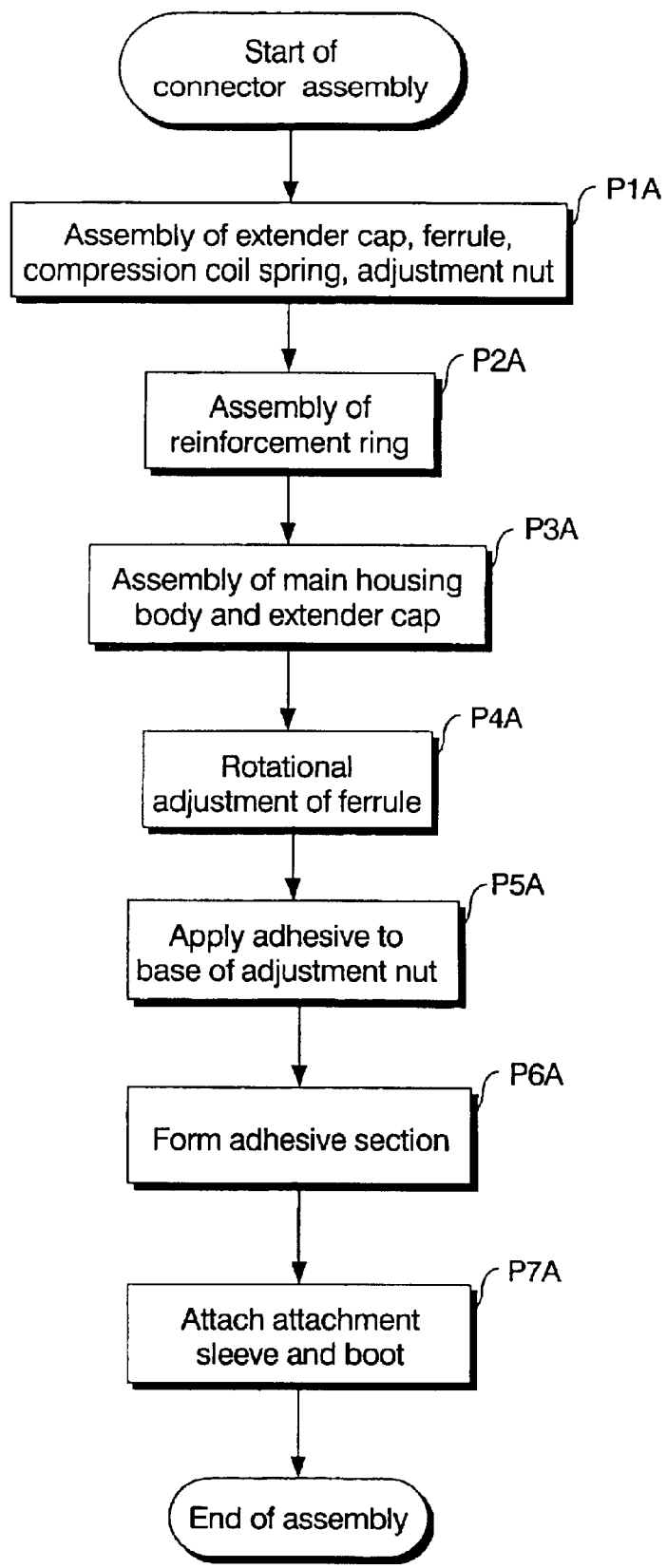
FIG. 32 is a process diagram for the assembly of an optical fiber connector.

As shown in FIG. 32, the extender cap 55, the ferrule 3A, the compression coil spring 4A, and the adjustment nut 75 are assembled in step P1A. The adjustment nut 75 is assembled by engaging the pair of keys 77 of the adjustment nut 75 with the pair of slits 71 of the retention member 70. Then, the compression coil spring 4A fits onto the outside of the ferrule 3A, and the ferrule 3A is inserted through the extender cap 55 and the retention member 70. The ferrule 3A is rotated so that it is inserted through the extender cap 55 and the retention member 70, and the base-end threaded section 64 engages and fits inside the adjustment nut 80.

Next, at step P2A, the reinforcement ring 80 is assembled by engaging the pair of claws 82 of the reinforcement ring 80 with the pair of slits 71 of the retention member 70.

Next, at step P3A, the main housing body 50 and the extender cap 55 are assembled. After the main housing body 50 and the extender cap 55 are assembled, the flange 63 of the ferrule 3A, which is biased toward the leading end by the compression coil spring 4A, engages with the inner collar 51a of the housing 2A. At any one of steps P1A–P4A, the ferrule 3A is rotated to adjust the engagement position of the ferrule 3A with the adjustment nut 75 so that there is maximum engagement between the pair of keys 77 of the adjustment nut 75 and the pair of slits 71 of the retention member 70.

Figure 33:
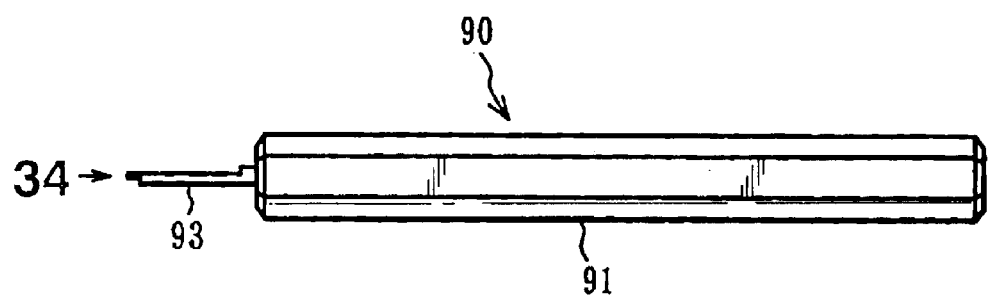
FIG. 33 is a side elevational view of a rotation adjustment tool.
Figure 34:
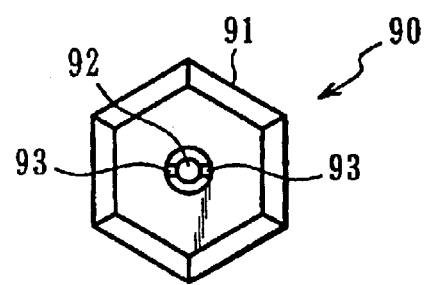
FIG. 34 is an elevational view of the rotation adjustment tool of FIG. 33 as seen from arrow 34 of FIG. 33.

Next, at step P4A, the ferrule 3A is rotationally adjusted. A rotation adjustment tool 90 used in this step, as shown in FIGS. 33 and 34, comprises a hexagonal grip 91, an insertion opening 92 on the grip 91, and a pair of forked insertion engagement sections 93 projecting from the grip 91 toward the leading end. An optical fiber F is attached to the assembled ferrule 3A before the connector assembly process, and the optical fiber F, extending through the retention member 70, extends toward the base-end side of the retention member 70.

When the ferrule 3A is to be rotationally adjusted, the optical fiber F, which extends toward the base-end side of the retention member 70, is inserted through the insertion opening 92 of the rotational adjustment tool 90. The pair of insertion engagement sections 93 are inserted from the base-end side of the retention member 70. The ends of the pair of insertion engagement sections 93 engage with the rotation operation section 65 of the ferrule 3A. Then, the ferrule 3A is rotated by turning the rotational adjustment tool 90 while the light transmission efficiency is measured using an optical characteristics measuring device at the end of the ferrule 3A. The ferrule 3A is aligned to the position where optical loss is minimized.

Next, in step P5A, when the rotation adjustment tool 90 is pulled out, an injecting member, e.g., an injection needle for injection of adhesive, is inserted into the base end of the retention member 70. An adhesive is injected and applied to the section of the adjustment nut 75 at the base end where it contacts the ferrule 3A. At step P6A, the ferrule 3A is kept stationary while the adhesive applied at step P5A sets, thereby forming an adhesive section 79. Then, in step P7A, the attachment sleeve 85 and the boot 88 are assembled. The assembly of the connector 1A is completed when the assembly of the attachment sleeve 85 and the boot 88 is completed.

This connector 1A provides essentially the same operation and advantages as the connector 1 of the embodiment described above. However, since the functions of the key member 30 and the adjustment nut 35 are both provided by the adjustment nut 75, in which the nut section 76 and the key 77 are formed integrally, the structure of the rotation-restricting slide mechanism 5A can be simplified. This provides an advantage in production cost and also simplifies the assembly of the connector 1A that includes this rotation-restricting slide mechanism 5A.

Also, since the adjustment nut 75 fits inside the retention member 70 and is guided so that it can move along the axis, the ferrule 3A that is formed integrally with the adjustment nut 75 can be moved smoothly along the axis.

Since the retention member 70 is metallic and fits inside and is secured to the extender cap 55, a pair of slits 71 can be reliably machined in the retention member 70. Furthermore, the strength of the retention member 70 can be increased, and the adjustment nut 75 can be reliably guided. Also, the attachment sleeve 85 can fit onto the outside of the retention member 70 and locked securely without deformation by reinforcing the retention member 70 with the reinforcement ring 80.

It is not required that the retention member 70 be formed separately from the extender cap 55. The extender cap 55 and the retention member 70 can, for example, be formed integrally from a synthetic resin material.

In the embodiments described above, the connectors 1, 1A optically connect optical fibers to each other using an adapter. However, the connectors 1, 1A can also be used as connectors that form optical connections using receptacles.

Various changes and modifications may be effected without departing from the spirit of the present invention, and the present invention can be implemented for different types of optical connectors.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An optical fiber connector attached to an end of an optical fiber and used with an adapter in an optical connection, said optical fiber connector comprising:

a housing attachable to and removable from said adapter comprising:
　a main housing body that is attachable to and removable from said adapter, and
　an extender cap engaged with and connected to said base end of said main housing body;

a ferrule through which a cladding portion at said end of said optical fiber is inserted and supported, said ferrule being housed slidably toward an axial direction in said housing in a rotatable manner in an assembly step comprising a base-end screw inserted through said extender cap and projecting toward said base end of said housing;

a compression coil spring mounted in said housing and biasing said ferrule along an axis and toward said end of said optical fiber; and a rotation-restricting slide mechanism disposed toward a base end of said housing, said rotation-restricting slide mechanism restricting rotation of said ferrule relative to said housing and allowing a sliding motion along said axis, comprising:

a slit formed on said extender cap and extending along said axis;

a key member comprising a key slidably engaging with said slit and fitting onto said base-end screw of said ferrule;

an adjustment nut abutting a base-end surface opposite from said key of said key member and fitting onto and screwed to said base-end screw of said ferrule; and an adhesive section securing said adjustment nut and said key member.

2. An optical fiber connector as described in claim 1 wherein said rotation-restricting slide mechanism comprises an adhesion section for securing said ferrule and said adjustment nut.

3. An optical fiber connector as described in claim 2 wherein a rotation operation section for rotating said ferrule is formed at said base-end threaded section of said ferrule.

4. An optical fiber connector as described in claim 1 wherein:

said ferrule is rotationally adjusted relative to said housing and said key member; and said adjustment nut and said key member are fixed by said adhesive section when a rotational phase is set to maximize light transmission efficiency.

5. An optical fiber connector as described in claim 1 wherein:

said ferrule is rotationally adjusted relative to said housing and said key member; and said adjustment nut and said key member are fixed by said adhesive section when a rotational phase is set to minimize polarization crosstalk.

6. An optical fiber connector attached to an end of an optical fiber and used with an adapter in an optical connection, said optical fiber connector comprising:

a housing attachable to and removable from said adapter comprising:
　a main housing body that is attachable to and removable from said adapter, and
　an extender cap engaged with and connected to said base end of said main housing body;

a ferrule through which a cladding portion at said end of said optical fiber is inserted and supported, said ferrule being housed slidably toward an axial direction in said housing in a rotatable manner in an assembly step comprising a base-end threaded section passing through said extender cap and extending to said base-end of said housing;

a compression coil spring mounted in said housing and biasing said ferrule along an axis and toward said end of said optical fiber; and a rotation-restricting slide mechanism disposed toward a base end of said housing, said rotation-restricting slide mechanism restricting rotation of said ferrule relative to said housing and allowing a sliding motion along said axis, comprising:

a retention member fixed to said extender cap and through which said ferrule is inserted;

an axially oriented slit formed on said retention member;

an adjustment nut movably housed in said retention member and integrally formed from a nut section screwed to the outside of said base-end threaded section of said ferrule; and a key slidably engaged with said slit.

7. An optical fiber connector as described in claim 6 wherein said adjustment nut fits inside said retention member and is guided to move in said axial direction.

8. An optical fiber connector as described in claim 6 wherein said retention member is formed from a metal material and fits inside and is secured to said extender cap.

9. An optical fiber connector as described in claim 7 wherein said retention member is formed from a metal material and fits inside and is secured to said extender cap.

10. An optical fiber connector as described in claim 6 wherein said rotation-restricting slide mechanism comprises an adhesion section for securing said ferrule and said adjustment nut.

11. An optical fiber connector as described in claim 7 wherein said rotation-restricting slide mechanism comprises an adhesion section for securing said ferrule and said adjustment nut.

12. An optical fiber connector as described in claim 8 wherein said rotation-restricting slide mechanism comprises an adhesion section for securing said ferrule and said adjustment nut.

13. An optical fiber connector as described in claim 9 wherein said rotation-restricting slide mechanism comprises an adhesion section for securing said ferrule and said adjustment nut.

14. An optical fiber connector as described in claim 10 wherein a rotation operation section for rotating said ferrule is formed at said base-end threaded section of said ferrule.

15. An optical fiber connector as described in claim 11 wherein a rotation operation section for rotating said ferrule is formed at said base-end threaded section of said ferrule.

16. An optical fiber connector as described in claim 12 wherein a rotation operation section for rotating said ferrule is formed at said base-end threaded section of said ferrule.

17. An optical fiber connector as described in claim 13 wherein a rotation operation section for rotating said ferrule is formed at said base-end threaded section of said ferrule.

* * * * *